(12) United States Patent
Beacham

(10) Patent No.: US 7,171,382 B2
(45) Date of Patent: Jan. 30, 2007

(54) METHOD AND SYSTEM OF ENABLING MINORS TO MAKE STOCK MARKET TRANSACTIONS VIA THE INTERNET WITH ADULT AUTHORIZATION

(76) Inventor: Susan P. Beacham, 825 S. Waukegan Rd., Lake Forest, IL (US) 60045

( * ) Notice: Subject to any disclaimer, the term of this patent is extended or adjusted under 35 U.S.C. 154(b) by 1375 days.

(21) Appl. No.: 09/825,714

(22) Filed: Apr. 5, 2001

(65) Prior Publication Data

US 2003/0088490 A1    May 8, 2003

(51) Int. Cl.
*G06F 17/60* (2006.01)
(52) U.S. Cl. ............... 705/35; 705/39; 705/42; 235/380; 902/26
(58) Field of Classification Search ............ 705/35, 705/39, 42; 235/380; 902/26
See application file for complete search history.

(56) References Cited

U.S. PATENT DOCUMENTS 5,934,674 A    8/1999    Bukowsky
6,032,141 A    2/2000    O'Connor et al.

OTHER PUBLICATIONS

Kidstock (http://www.kidstock.com).*
Kidstock (www.kidstock.com).*
MainXchange (www.mainxchange.com).*
Printout from the Internet, URL: http://library.thinkquest.org May 2000.
Printout from the Internet, URL:http://www.aaesa./Marketplace/mainXchange.htm; May 2000.

* cited by examiner

*Primary Examiner*—Vincent Millin
*Assistant Examiner*—Daniel S. Felten
(74) *Attorney, Agent, or Firm*—Clausen Miller, P.C.

(57) ABSTRACT

A method and system for enabling adults to perform stock market transactions on behalf of minors and other young persons who have demonstrated sufficient knowledge of the stock market. The method comprises enabling an adult to set up and put money into a custodial account that can be accessed by the minor, enabling the minor to make a stock transaction request, notifying the adult of the stock transaction request, and enabling the adult to fulfill the stock transaction request on behalf of the minor. The method can also include instructing the minor on the stock market and evaluating the minor's knowledge of the target stock before transmitting the stock transaction request to the authorizing adult.

11 Claims, 1 Drawing Sheet

Figure 1:
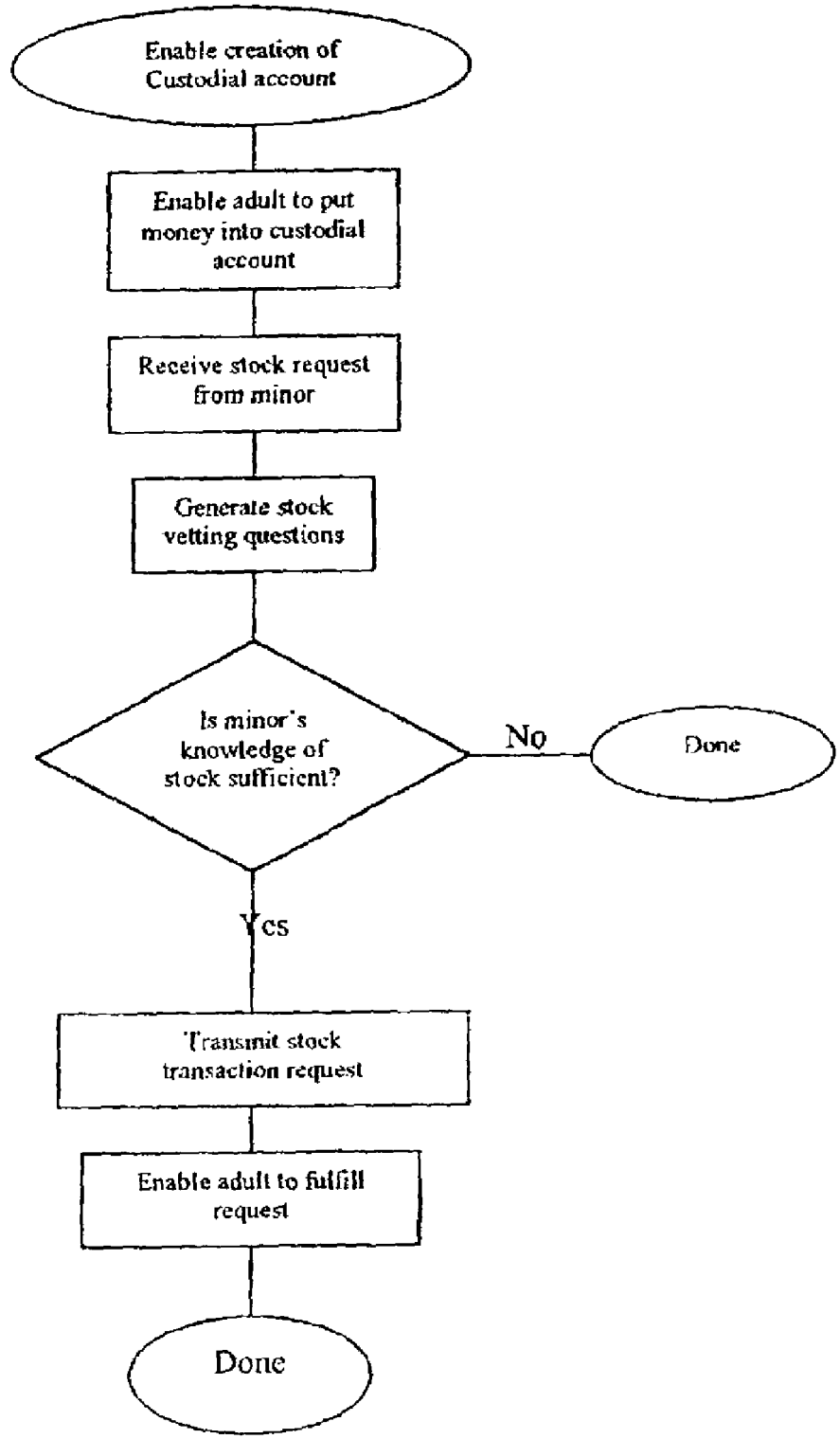

METHOD AND SYSTEM OF ENABLING MINORS TO MAKE STOCK MARKET TRANSACTIONS VIA THE INTERNET WITH ADULT AUTHORIZATION

BACKGROUND

1. Field of the Invention

This patent relates to a method of teaching minors and other young persons about the stock market via the Internet. More specifically, this patent relates to a method for enabling minors to make stock market or other investment transactions by demonstrating sufficient investment knowledge and obtaining the authorization of an adult.

2. Description of the Related Art

Games that teach young persons about money in general and the stock market in particular are known. For example, Bukowsky U.S. Pat. No. 5,934,674 discloses a simple stock market game played using a game board, an electronic display, stock tokens, and action cards. Players move around the board buying and selling stock, represented by the tokens, and playing action cards representing different market conditions. The "stocks" are revaluated from time to time depending on which action cards are played.

O'Connor et al. U.S. Pat. No. 6,032,141 discloses a rule-based tutorial system that utilizes business simulations of actual environments to teach new skills tailored to a student's personality. The system is illustrated using a model for purchasing real estate analyzing an own-versus-rent decision. A stock market model is also mentioned.

While these inventions may have some educational and/or entertainment value, they are mere simulations. Neither can be used to enable young persons to make real financial transactions with the approval and authorization of an adult.

There are also Internet sites that purport to teach persons of all ages about finances and the stock market. For instance, MainXchange (www.aaesa.org/Marketplace/mainXchange.htm) describes itself as a "Free Interactive Internet Stock Market Teaching Tool" generally aimed at middle and high school through college students and adults, although some advanced upper elementary students may also find it educational. Like the present invention, MainXchange allows a user to research companies before investing and then invest in publicly traded stocks. However, unlike the present invention, MainXchange is merely a simulation. MainXchange does not allow an adult to set up a real money custodial account for a minor, nor does it allow a minor to place stock purchases on a "wish list" where an adult can "grant the wish" by fulfilling the stock transaction. MainXchange does ask "trivia questions", presumably about the stock market, but it does not vet the user's knowledge of the stock market or a particular stock pick before allowing them to place a stock transaction on their "wish list".

The EduStock Internet site (http://library.thinkquest.org/3088/welcome/welcome.html) also is designed to teach persons "young and old" about the stock market, and includes a stock market simulator where a user can create and maintain a virtual stock portfolio and watch the progress of the stocks over time. The simulator tracks the performance of actual stocks and changes the value of the user's virtual portfolio accordingly. Although the user can research company profiles before "buying" a stock, the simulator does not ask the person questions in order to vet their knowledge of the company or the stock market before allowing them to invest. Since it is merely a simulation, the simulator does not allow an adult to place real money in a savings account from which a minor can draw funds to invest. Instead, like the MainXchange simulator, each user gets a nominal sum of virtual money to start the simulation.

None of the prior art references teaches a method for enabling adults to perform stock market transactions on behalf of minors or young persons who have demonstrated sufficient knowledge of the stock market.

Thus it is an object of the present invention to provide a system and method for teaching minors and other young persons about finances, including the stock market.

Another object is to enable minors and other young persons to make stock market transactions via the internet with the approval and authorization of an adult.

A still further object of the present invention is to provide a method for evaluating the young person's knowledge of a target stock before enabling the teen to make a stock transaction request.

Yet another object of the present invention is to provide a method for an adult to grant the stock transaction request using either money from the young person's custodial account or the adult's own money.

Further and additional objects will appear from the description, accompanying drawings, and appended claims.

SUMMARY OF THE INVENTION

The present invention is a system and method of enabling minors and other young persons to make adult-supervised stock transactions via the Internet. The method comprises the following steps: First, the adult (parent or guardian) must set up a custodial account for the young person or minor with an on-line brokerage firm. The parent puts money (an "allowance") into an on-line savings fund for the minor that can be accessed through a proprietary on-line web site. The minor may then save the money, spend it, donate it to charity, or invest it. If the minor chooses to invest the money, the minor must answer a number of "stock-vetting" questions about the target company to demonstrate her knowledge of the target company or fund. The minor may research the target company if desired. Once she answers a sufficient number of the stock-vetting questions correctly, she can place her stock choice on a "wish-list" using the on-line web site. The adult is then notified of the wish-list addition. The adult can complete the stock purchase by "granting the wish" and buying the stock online through the web site. The stock is then placed in the minor's online stock portfolio. In this manner a minor can learn how to research a stock, place an "order", and follow changes in the stock's market value and in the child's stock portfolio value.

DRAWING

FIG. 1 is a flow diagram of one routine that enables a young person to effect a stock transaction with the authorization of an adult.

DETAILED DESCRIPTION OF THE INVENTION

The present invention is a method and system for enabling a minor or other young person to learn about the options available to them for handling their money, and to apply that knowledge to the real world, including making purchases, saving, making donations, and investing in the stock market.

The method comprises the following steps: First, enabling an adult to set up a custodial account for the young investor with an on-line brokerage firm. Second, enabling the adult to put money (an "allowance") into the young person's custodial account that can be accessed through a proprietary on-line web site. Third, enabling the young person to spend the money, save it, donate it to charity, or invest it. Fourth, if the young person chooses to invest the money, enabling the young person to research a potential target investment, such as a publicly traded company or a mutual fund. Fifth, generating "stock vetting" questions about the target investment that the young person must answer. Sixth, once she answers a sufficient number of the stock-vetting questions correctly, enabling the young person to place her investment choice on a "wish-list" using the on-line web site. Seventh, notifying the adult, preferably via email, of the young person's "wish-list" addition. Eighth, enabling the adult to complete the stock purchase by "granting the wish" and buying the stock online through the web site. Finally, the stock is then placed in the young person's online stock portfolio. In this manner a young person can learn how to research a stock, place an "order", and follow changes in the stock's market value and in the young person's stock portfolio value. A summary of the routine that enables a young person to make a stock transaction with the authorization of an adult is provided in FIG. 1.

The system comprises means for displaying information about a target stock on a video display terminal, means for evaluating the young person's knowledge of the target stock, means for enabling the young person to make a stock transaction request, means for transmitting the request and the evaluation to an adult, and means for enabling the adult to grant the request.

Opening an Account

The present invention allows a young person, such as a teen, enabled by an adult such as a parent or grandparent, to register with a service provider and open a custodial account. The custodial account can include smaller accounts such as an allowance "stash", an online savings account, and an online investment account.

Shop, Save, Donate, Invest Options

Once a young person has registered and a custodial account has been set up, teens have the options of spending their money on the Internet site through retail partners, saving their money in a savings account, donating money to charities of interest to them, or investing through the service provider's financial services partners.

Parent's Portal

The invention also allows the parent to access the service provider's Internet site, to open custodial accounts, fund an allowance, track earnings related activities, monitor savings progress, enable investing (by "granting" an investment request), and track a child's spending.

Parents enable their child's financial transactions by first establishing a custodial savings account online. A separate "Parent's Portal" enables an adult to register and fund the custodial account. An account can be opened for as many children as desired, although it is anticipated that typically the children will be members of the adult's household.

Parents can give their children money any time they wish, initiated by the parent or by an automatic transfer feature. Deposits to an account can be made by check, money order, or by transfers from another financial institution. Recurring transfers from, say, an adult's savings account, to the child's account, can be done for a desired amount and frequency (for example, $50 per month).

Because parental involvement is required in the custodial accounts, parents and children, typically teens, share in the learning experience.

Account Access

In a secure section of the site, the teen can check out her account balance and access her account. In addition to the balances in their "allowance stash", "savings account" and "investment portfolio", teens can monitor their spending, donations and investment performance.

Learning Component

An important feature of the invention is the learning component, which allows teens to learn independently or collaboratively with their adult custodian. The system includes educational content and interactive tools to teach teens about shopping smart, using coupons, compounding interest, charitable giving, stocks, bonds, and mutual funds. For example, by entering a "Savvy Investing" portal, the teen (or adult) can learn about such issues as the difference between saving and investing, and what a stock is.

Charitable Component

For teens who are charitably inclined, numerous charities can be made available to enable teens to donate to the charity of their choice. Donations can come from the teen's "allowance stash" or from savings and are transmitted electronically to the selected charity.

Savings

By entering a savings portal, teens can learn about the importance of savings. The savings feature helps teens set and meet their savings goals. The invention allows parent to match savings if they choose.

Shopping

By entering a shopping portal, teens can browse, compare prices, use coupons, and buy online. A wide range of merchants can be made available through the shopping portal. For some products offered through some merchants, teens can use a buyer advocate purchasing utility to get the best possible price. On-line purchases can be paid for through the "allowance stash", from the teen's own secured credit card, or from their parent's credit card, with permission.

On-line retail partners may offer goods and services such as educational items, sports equipment, or even entertainment items. The retailers are accessed through the shopping portal.

Investing

By entering an investing portal, "investment savvy" teens can invest online through an online brokerage account and a parental permission process whereby adults authorize the teen's investment choices. The process by which investment transactions are made is explained in more detail below.

Investment Simulation Game

An investment simulation game, such as those known in the art, allows teens to invest in their own mock portfolio to test their investing skills in a "safe" environment.

Investment Analyzer and Evaluation Process

In order to make stock transactions, teens must become investment savvy by educating themselves about investment concepts in general and the specific companies or funds that interest them. Online company research is available to educate teens about a specific company's fundamentals. With the available company research, teens can learn about a company and decide if they are interested in investing.

The learning is facilitated by a multiple-step question and answer evaluation process that allows teens to learn the fundamentals about a target company of interest and evaluates the teen's knowledge of the target company. The teen's answers to the questions are saved for subsequent review or revision. If necessary, the teen can answer the questions over multiple sessions.

Making a Stock Transaction

When the teen knows enough about a company to decide that it is a good investment and has demonstrated that knowledge via the evaluation process, such as by answering at least a pre-determined percentage of questions correctly, she can place it on her "wish list" with her rationale for wanting to invest. The teen can then send her parent an email from the site indicating that she wants authorization to make the transaction. This initiates the adult permission process.

Adult Permission Process

By entering the "parent's portal" the parent can see the teen's "wish list". The parent can authorize the desired trade by using the teen's available cash, or, as a gift, fund the trade themselves. Other adults, such as grandparents, can also be authorized to grant an "Investment Savvy" teen's request as a gift.

Once the request has been granted, online trading is instantaneous through an online brokerage partner, with immediate trade confirmation sent back to the authorizing adult and the teen.

Other modifications and alternative embodiments of the invention are contemplated which do not depart from the spirit and scope of the invention as defined by the foregoing teachings and appended claims. It is intended that the claims cover all such modifications that fall within their scope.

I claim as my invention:

1. A method of enabling a minor to effect an investment transaction via the Internet with the authorization of an adult, comprising the following steps:
   a. enabling the adult to set up a custodial account for the minor with an on-line brokerage firm;
   b. enabling the adult to put money into the custodial account that can be accessed by the minor through an online web site;
   c. enabling the minor to research a target investment;
   d. generating questions about the target investment for the minor to answer on the online web site;
   e. determining if the minor has answered correctly at least a predetermined percentage of the questions;
   f. enabling the minor to place an investment choice on a wish-list located on the online web site if the minor has answered correctly at least the predetermined percentage of questions about the target investment;
   g. notifying the adult of the placement of the investment choice on the minor's wish-list; and
   h. enabling the adult to fulfill an investment purchase wish on behalf of the minor by purchasing the target investment online through the web site.

2. The method of claim 1 further comprising the step of providing interactive tools to assist the minor in learning about investing and investments.

3. The method of claim 1 wherein step (h) includes allowing the adult to fulfill the investment purchase wish by purchasing the target investment with a cash gift from a gifting adult.

4. A system for enabling a minor to make an adult-authorized investment transaction via the Internet, comprising:
   means for displaying information about a target investment on a video display terminal;
   means for evaluating the minor's knowledge of the target investment and producing an evaluation;
   means for enabling the minor to access an online website and add an investment choice to an online wish-list;
   means for notifying an adult of the placement of the investment choice on the minor's wish-list; and
   means for enabling the adult to fulfill the investment choice on behalf of the minor.

5. The system of claim 4 further comprising means for setting up a custodial account for the minor and means for enabling the adult to put money into the custodial account.

6. The system of claim 5 wherein the custodial account comprises an allowance stash, a savings account and an investment account.

7. The system of claim 5 further comprising means for enabling the minor to donate money to a charity.

8. The system of claim 5 further comprising means for enabling the minor to purchase goods or services from money in the allowance stash.

9. The method of claim 1 wherein step (h) includes allowing the adult to fulfill the investment purchase wish by purchasing the target investment with the money available in the custodial account.

10. The method of claim 3 wherein the gifting adult is the custodial adult.

11. The method of claim 3 wherein the gifting adult is an authorized non-custodial adult.

* * * * *